May 2, 1961 E. M. SMITH 2,982,878
ELECTRODE SUPPORT
Filed Nov. 23, 1954
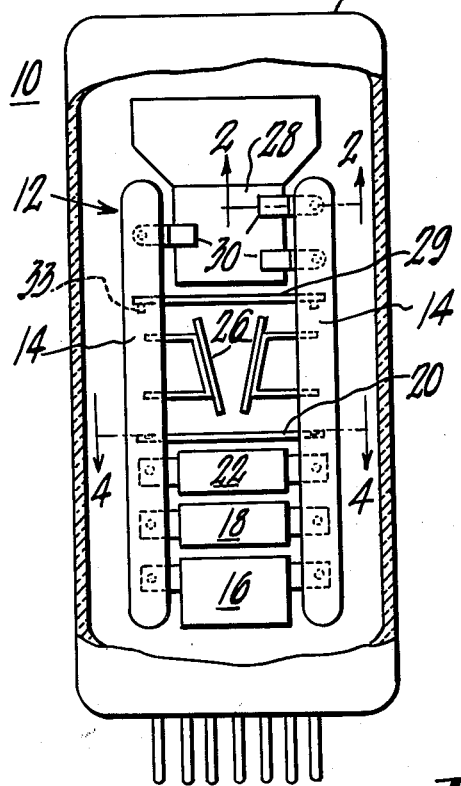
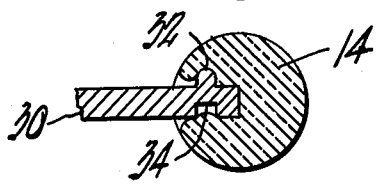
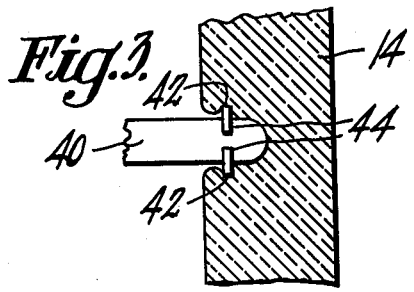
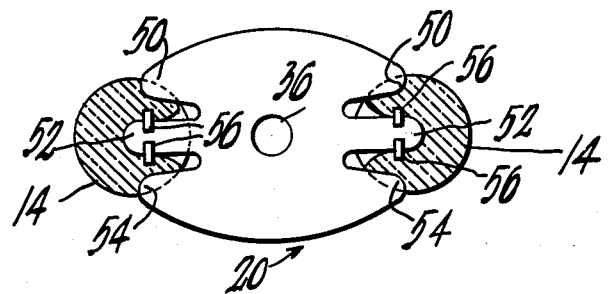
INVENTOR.
Edgar Merle Smith
BY William A. Zalesak
ATTORNEY ature of the glass and metal. The glass filling in the curves will curve smoothly also. Hence there is very little anchoring action between the glass and metal.

Accordingly, it is an object of this invention to provide an improved electrode support for cathode ray tube guns.

It is a further object of this invention to provide an improved, strong, tight joint between the metal support rod and the glass insulating bead used in the electrode structures of electron tubes.

It is a further object to provide an improved electrode support of the character described which makes a much stronger mechanical joint, without requiring a metal-to-glass seal.

It is a further object to provide a mounting for metal electron gun parts on glass side rods in which the support elements which engage the glass side rods are formed integrally in the parts themselves.

The above and related objects are achieved according to the invention by providing at the end of a metal supporting member one or more studs which lock into the glass bead. To form the studs the supporting member is first blanked out with the cross-sectional area large enough to provide the required mechanical strength. The support is then stamped to produce slight projections or studs. The studs need only to be inserted a slight distance into the molten glass to achieve locking. When the member is inserted into the molten glass bead, the relatively small studs displace very little glass. The small voids which are formed are readily filled in by the glass flowing around the studs, and when the glass cools and solidifies the member is locked in the glass by the studs.

According to another aspect of the invention the elements for supporting a disk-like electrode are formed integrally in the electrode itself. The electrode is blanked out so as to form three tongues on its periphery. The middle tongue is provided with one or more studs, and the other two are smooth. The tongues may then be inserted into the glass rod, and when this is done, the studs on the middle tongue lock the electrode against lateral movement and the outer tongues lock it in against rotational movement.

In the drawings:

Fig. 1 is a partially cut away view of one type of electron discharge device embodying the improved support means according to the invention;

Fig. 2 is a section taken along line 2—2 of Fig. 1;

Fig. 3 is a modification of the support shown in Figs. 1 and 2;

Fig. 4 is a section taken along line 4—4 of Fig. 1 and showing a disk-shaped electrode having support means integrally formed in the electrode.

Referring to Fig. 1 in more detail there is shown, by way of example, a cathode ray tube 10 including an electrode structure 12 supported on glass side rods 14. The part of the electrode structure forming the electron gun includes a cathode (not shown) mounted within a control grid 16, accelerating electrodes 18 and 20 and a focusing electrode 22. The electron gun produces and accelerates a fine beam of electrons directed toward a fluorescent screen on the interior surface of the viewing end 24 of the tube 10. A pair of deflection plates 26 when energized by suitable operating potentials from the source (not shown) deflect the beam horizontally. A second set of deflection plates 28, one of which is shown, are caused to deflect the beam vertically. An apertured disc or deflection plate shield 29 is disposed between the two sets of deflection plates 26 and 28.

In accordance with the invention, the deflection plate 28 is supported on the side rods 14 by means of a plurality of metal supports 30 each attached to the plate 28 at one end and embedded in one of the glass rods 14 at the other end. The end of the support 30 embedded in the glass has a stud 32 projecting from a surface of the support and normal to a long axis of the support.

As best shown in Fig. 2, the stud may be formed by a stamping operation which leaves a depression or hole 34 opposite the stud 32. This permits selection of a particular cross-sectional area to give the support the required mechanical strength. Then when the stud 32 is formed, it need only project far enough to allow the molten glass to cover it and give the desired locking action without causing excessive distortion of the glass. By providing a sharply formed projection, like the stud 32, there is less tendency to distort and weaken the glass. This is due to the fact that the stud, because of its small dimensions need only be pushed a small distance into the molten glass to afford locking, and only a small void is formed. Furthermore, the molten glass will more readily flow into the corners around the stud than it will around a gradually tapered projection, like spatulation; therefore the locking action is enhanced. Thus the cross sectional area of the support and the dimensions of the stud can be kept down to a minimum, and the extent to which the support and the stud extend into the glass bead can be kept low, to minimize the voids and keep down glass cracks and yet the locking action will be improved.

A modification of the invention is shown in Fig. 3, in which the support 40 is provided with two oppositely located studs 42 projecting from the edges of the support. Again the studs may be formed by a stamping operation by which the metal of the support is caused to be depressed, as at 44, and pushed outwardly to form the studs 42.

The two stud arrangement has the advantage of providing double anchoring action as well as providing added resistance against the tendency of the support to rotate.

An additonal advantage of stamping out the support to provide depressions as well as studs is that the glass may flow into the depressions as well as around the studs, thereby enhancing the anchoring action.

Ideally, the studs, whether they be of single or double construction, should project in a direction parallel to the long axis of the glass side rod, as shown in Fig. 3. This allows the studs to spread freely into the glass; whereas if the mounting is such that the studs project towards the edge of the bead, their size is limited by the size of the bead. For if they project too far towards the edge, the glass bead has a greater tendency to distort and be weakened. Where the shape of the electrode and its support and the orientation of the electrode with respect to the other electrodes does not permit such a mounting, glass cracks are nevertheless avoided because the studs can be made quite small and still lock adequately.

The shape of the stud may take various forms. It may have a generally cylindrical shape, as shown in Figs. 1 and 2, or it may have a rectangular cross-section, as shown in Fig. 3; or it may be conical or a combination of the foregoing shapes.

Fig. 4 shows an electrode mounting in which the support elements are formed integrally in the electrode itself. The disk-shaped electrode 20 as shown is generally oval-shaped though it may have a circular shape. The electrode 20 has a central aperture 36 for passing an electron beam. The electrode is provided with two groups of tongues 50, 52, and 54 which project into the glass side rods 14. The middle tongue 52 is shown having the two stud arrangement as shown in Fig. 3. However in this case the studs 56 extend in a directional normal to the axis of the side rod 14. If the one stud arrangement is used, the stud would extend in the same direction as the rod axis as shown at 33 on the electrode 29 of Fig. 1. As indicated previously, the studs 56 can be made quite small so that they do not project too far towards the edge of the bead or rod 14. The tongues 50 and 54 have smooth edges. The tongues 50 and 54 lie on opposite sides of an axis through the middle tongue 52, and lock the electrode in against rotational movement about said axis. The studs 56 anchor the electrode in the glass bead against lateral movement. Thus a very compact and rigid support is provided for an electrode which can be formed by simple blanking and stamping operations.

In assembling the electrodes of the structure 12, one preferred method comprises first aligning the electrodes on a mandrel with the desired spacing between adjacent electrodes. One of the side rods is then placed in a groove in a holder of suitable refractory material and the side rod is heated to the softening point of the glass. The electrode assembly is then moved towards the molten side rod and the metal support (or tongues) is pushed into the molten glass. The support and the studs push away the glass but the voids are quickly filled by the glass flowing around the studs. Thereafter the glass is cooled and solidified to firmly anchor in the supports.

The invention thus provides improved means for supporting electrodes in glass side rods. The support can be inserted only a small distance into the molten glass and yet the studs will interlock with the glass. Voids or distortion in the glass are thus reduced and the strength of the glass is retained. Furthermore, the molten glass more readily fills in the sharp corners around the stud to provide more positive locking action.

What is claimed is:

An electrode mounting for an electron discharge device comprising a glass rod, an electrode, and means for supporting said electrode on said glass rod, said means including an elongated metal member extending outwardly from said electrode, said member having its extending end embedded in said glass rod, said extending end being formed with at least one stud projecting therefrom normal to both the longitudinal axis of said elongated member and the longitudinal axis of said glass rod, said extending end having a depression in its surface opposite said stud of substantially the same size as said stud, said stud being relatively small compared to said extending end whereby said extending end and said stud need extend only a minimum distance into said glass rod, said stud comprising a relatively sharply formed projection whereby molten glass will more readily flow around said stud.

References Cited in the file of this patent

UNITED STATES PATENTS

| | | |
|---|---|---|
| 8,795 | Nott | Mar. 9, 1852 |
| 171,394 | Lehmann | Dec. 21, 1875 |
| 1,973,006 | Loewe | Sept. 11, 1934 |
| 2,056,751 | Von Till | Oct. 6, 1936 |
| 2,144,820 | Thomas | Jan. 24, 1939 |
| 2,430,478 | Nelson | Nov. 11, 1947 |
| 2,463,577 | Stutsman | Mar. 8, 1949 |
| 2,561,247 | Throm | July 17, 1951 |
| 2,701,320 | Kovach | Feb. 1, 1955 |
| 2,707,848 | Pityo | May 10, 1955 |
| 2,732,511 | Ditchter | Jan. 24, 1956 |
| 2,834,907 | Glyptis | May 13, 1958 |